Oct. 3, 1939.   H. HEUSER   2,174,659
PROCESS OF AND APPARATUS FOR STERILIZING FOOD PRODUCTS
Filed Aug. 31, 1936
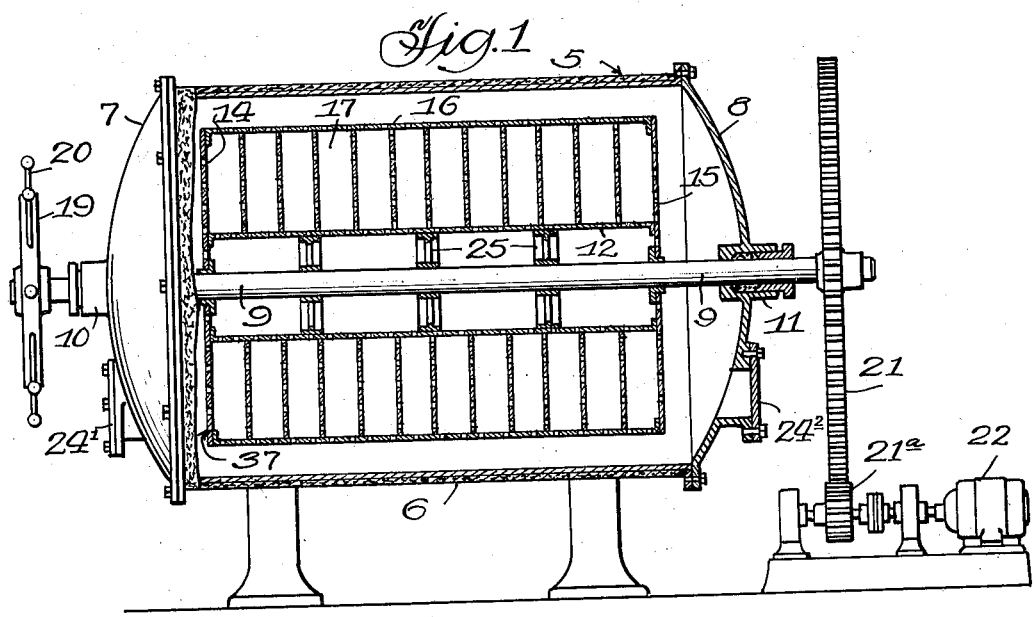
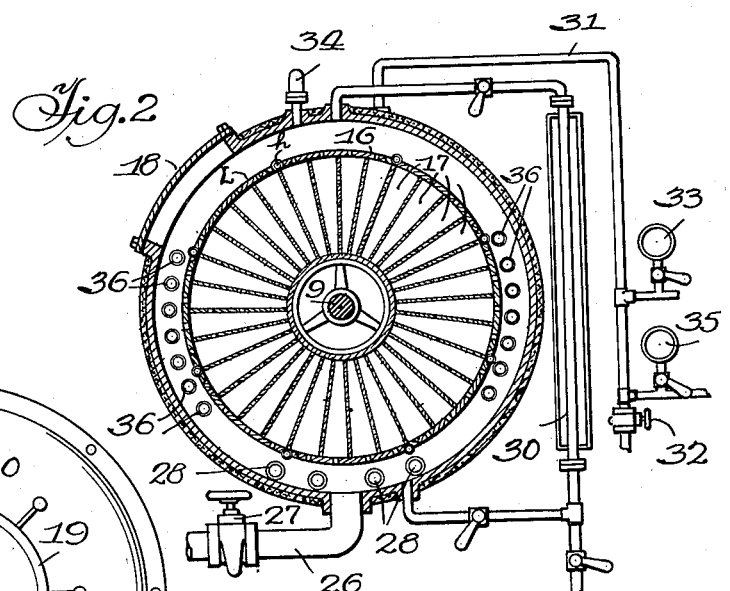
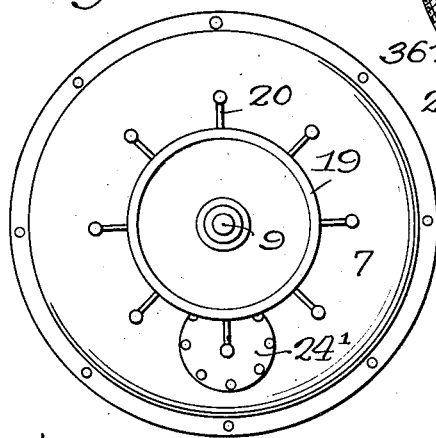
Inventor,
Herman Heuser,
Parkinson & Lane, Attys Patented Oct. 3, 1939

2,174,659

UNITED STATES PATENT OFFICE 2,174,659

PROCESS OF AND APPARATUS FOR STERILIZING FOOD PRODUCTS

Herman Heuser, Evanston, Ill.

Application August 31, 1936, Serial No. 98,719

9 Claims. (Cl. 53—21)

This invention relates to the sterilizing by heat of food products as, for example, vegetable products, fruit products, fish and meat products and the like, in such manner as to prevent, during the sterilizing operation, any detrimental physical effects upon the containers containing the food product, such as bulging, buckling or leaking of metal containers, and venting and possible breaking of glass containers.

The customary sterilizing of canned food products usually takes place at a temperature of 212° F., or at a temperature lying between 212° F. and 250° F. It has customarily heretofore been effected by live steam having a temperature corresponding to the sterilizing temperature of the particular food product. During the heating to the sterilizing temperature the containers in case of metal cans are liable to swell, and in case of glass jars they are liable to vent and possibly break. The swelling by having a loosening effect upon the seams of the cans frequently results in physical injury to the cans such as crimping or buckling of the cans, and in causing leaky cans. The contents of the buckled cans being usually sound are worked over again, but the leaky cans if the leaks are not detected have their contents entirely destroyed during storage by reason of ferments entering the cans through the leaks.

In an endeavor to prevent buckling, bulging, leaking and venting of the containers during the sterilizing of a food product, exhausting has been usually applied to the containers before they are sealed and sterilized. This exhausting which has been in use for a great many years has, however, not stopped the buckling, bulging or leaking of the cans, nor the venting and possible breaking of the glass containers. This I have discovered is due to the fact that the pressure reduction obtainable by exhausting is only a small fraction of the pressure that is in the cans or containers during the sterilizing of the canned food product therein.

I have found that the vacuum usually present in exhausted containers is as low as four inches and as high as fourteen inches, corresponding to an average pressure reduction in the cans or containers of about 4.5 lbs., and that the pressure in non-swelling containers filled with a food product may rise to about any pressure according to the filling up of the containers, the lowest pressure of which may be as low as 25 lbs., when the sterilizing takes place at 212° F., and the highest pressure as high as 75 lbs. when the sterilizing takes place at 250° F. This explains why the exhausting cannot prevent buckling, bulging and leaking of the cans, and the venting or possible breaking of glass jars during the sterilizing operation.

The fear of buckling, bulging, leaking or venting of the containers during the sterilizing of canned food products frequently induces the canner to reduce the sterilizing temperature or to shorten the sterilizing period. But this results in a larger number of containers with their contents becoming spoiled in storage because of the action of ferments originally contained in the food product not having been destroyed during the sterilizing at a reduced temperature or for a shortened period of time.

I have discovered that buckling, bulging, leaking or venting of the containers do not occur when the sterilizing of the canned food products is carried out with hot water in an hermetically sealed sterilizing apparatus filled prior to the hermetically sealing of the apparatus with such an amount of water that the proportion between the water filled space and the unfilled space in the sterilizing apparatus is substantially the same as that between the filled and unfilled space in the containers, and when the temperature of the water which is introduced into the sterilizing apparatus is substantially as high as the sealing temperature of the food product, that is to say, substantially as high as the temperature of the food product at the time when the food product was sealed in the containers, and when the heating and cooling of the water takes place without increasing or decreasing the weight of the water, that is to say, without changing the aforesaid proportion.

Under the conditions enumerated the pressure in the food container and the pressure in the sterilizing apparatus are substantially the same from the start of the sterilizing operation up to the end of the sterilizing operation, the pressure in both increasing at substantially the same speed during the heating and decreasing at substantially the same speed during the cooling, whereby the pressure in the containers is neutralized to such perfection that buckling, bulging, leaking or venting of the containers are entirely prevented.

In order to maintain the aforesaid proportion I carry out the heating of the water by surface contact of the water with the heating medium, which may be gas, oil, coke, coal, or steam, in jackets or pipes, or other suitable and operable heating medium, and I carry out the cooling of the water by surface contact of the water with a suitable cooling medium such as cold water, cold brine or the like, in jackets or pipes, or other suitable and operable cooling medium.

My invention may be carried out with or without the customary exhausting of the food product, and when it is carried out without exhausting then the processing of the food product is not only simplified but what is more important, the resulting sterilized food product is richer in taste and flavor than usually is the case. This is due to the avoidance of dissipation of the volatile taste and flavor substances from the food product always accompanying the exhausting operation.

Among the objects of my invention are to provide a process of and apparatus for sterilizing food products in such manner as to obtain the advantages and eliminate the disadvantages set forth above. Other objects, advantages and capabilities enumerated in my improved process and apparatus will later more fully appear.

My invention further resides in the combination, construction and arrangement of parts illustrated in the accompanying drawing, and while I have shown therein preferred embodiments, I wish it understood that the same are susceptible of modification and change without departing from the spirit of my invention.

In the drawing:

Fig. 1 is a vertical longitudinal section through one form of my apparatus suitable for carrying out my new process.

Fig. 2 is a vertical transverse section through the tank of the apparatus shown in Fig. 1, certain of the parts shown in Fig. 2 being omitted in Fig. 1 for the sake of convenience.

Fig. 3 is an end elevation looking toward the left-hand end of the tank shown in Fig. 1.

Referring in detail to the drawings, which show one form of apparatus suitable for carrying out my invention, the apparatus shown therein comprises a closed tank 5 made of steel or other suitable material consisting of a round horizontal cylinder 6 having dished heads 7 and 8. Tank 5 encloses a sterilizing drum 37 fixed upon a shaft 9 rotatable in stuffing boxes 10 and 11 on heads 7 and 8, respectively, which sterilizing drum may be turned by gear wheel 21 driven through pinion 21a by motor 22. Tank 5 is covered by an insulating material such as cork or the like.

Drum 37, consisting of two spaced cylinders 12 and 16 made of a suitable perforated or openwork metal and closed on the sides by perforated circular metal plates 14 and 15, is supported and held in position by arms 25 fixed to shaft 9. The space between the perforated cylinders 12 and 16 is formed into small compartments or pockets 17 by crossing and re-crossing it with strong tinned wire netting, each pocket holding quite a number of cans or containers, each four adjacent longitudinal rows of pockets being provided with a perforated metal lid L hinged at h, which lids are closed and fastened shut when the respective four rows have been loaded, to hold the cans in position and to prevent them from falling out of the pockets during the revolving of drum 37, and which lids are open when the pockets are empty and ready to be filled.

The loading and emptying of the pockets 17 of drum 37 takes place through door 18 of tank 5 (shown in Fig. 2) extending horizontally from one end of the cylinder 6 to the other, and of sufficient width to give access to, for example, four horizontal rows of pockets. A gasket or other suitable sealing means is provided between door 18 and tank cylinder 6. Thus, when four horizontal rows of pockets have been loaded and closed by a four-row lid L, shaft 9 and drum 37 are turned by hand by means of wheel 19 provided with handles 20 (see Figs. 1 and 3) until the next four horizontal rows of pockets are opposite door 18, that is to say, in the loading position. Tank 5 is provided with manhole doors 24′ and 24². In order to be able to move drum 37 in and out of tank 5 in case of replacement or repairs, the tank heads 7 and 8 are made removable by flanging them to cylinder 6, and providing suitable gaskets or other sealing means therebetween.

The tank 5 (see Fig. 2) is equipped with a pipe 26 controlled by valve 27 serving as inlet and outlet means for the water, and further with two sets of pipes extending longitudinally within tank 5 from one end of the tank to the other end, namely, the heating pipes 28 at the bottom of tank 5 operated by pressure steam for heating the water in tank 5 by surface contact, and the cooling pipes 36 operated by cold water, brine or other suitable cooling medium for cooling the heated water in tank 5 by surface contact. Tank 5 is also provided with a liquid gauge 30 to indicate the level of water in tank 5, and also with a pipe 31 controlled by valve 32 for hermetically sealing and unsealing tank 5. A gauge 33 is also provided for indicating the super-atmospheric pressure in tank 5. There is also a gauge 35 for indicating the sub-atmospheric pressure or vacuum in tank 5, and a blow-off valve 34 set at the safety pressure for tank 5.

In Fig. 3 is shown a front view of wheel 19 fastened to shaft 9 on the outside of tank 5 and provided with handles 20 for turning shaft 9 and rotating drum 37 during the loading and unloading of the sterilizing apparatus.

The apparatus thus described may be used as an agitating or non-agitating cooker or sterilizer, that is to say, with drum 37 revolving or not revolving during the sterilizing as desired. Generally, however, the apparatus is used with drum 37 revolving.

In the following I will describe a process suitable to carry out my invention:

After the food product has been put in the containers, cans being here referred to for illustrative purposes, with the customary liquid for covering and seasoning the food product, which liquid may be for example a mild brine solution made with water and sodium chloride or a solution made with water, sodium chloride and some sugar or a sugar syrup, the cans are sealed without the customary preliminary exhausting, the temperature of the food product at the sealing time being 80° F. and the proportion between the filled space and the unfilled space in the cans being 11 to 1. The filled cans are conveyed to the sterilizing apparatus where they are put through door 18 into drum 37. Thereupon, after the sterilizing apparatus has been loaded and lids L shut, door 18 is closed and sealed.

With pipe 31 open, tank 5 has introduced into it so much water of 80° F. (the sealing temperature of the food product), that the proportion between the water filled space and the unfilled space in tank 5 is substantially the same as the proportion between the filled space and unfilled space in the cans, that is to say, 11 to 1. The amount of water thus introduced into tank 5 can be determined by aid of liquid gauge 30.

Right after the introduction of said water into tank 5 of the sterilizing apparatus has been completed, tank 5 is hermetically sealed by closing valve 32 of pipe 31. Motor 22 is then started and drum 37 caused to rotate. The water in tank 5 is then heated to the sterilizing temperature by introducing pressure steam into the pipes 28. During the heating of the food product to the sterilizing temperature, whatever that may be for the particular food product, but which is 250° F. in this example, the pressure in the sterilizing apparatus increases at the same speed as the pressure in the cans. When the sterilizing temperature for the food product has been reached, the heating of the water is continued only as much as is necessary to keep the food product at the sterilizing temperature.

After the sterilizing temperature has been kept up for the length of time required for the particular food product under sterilization, the water in tank 5 is cooled by turning on cold water into the pipes 36. During the cooling the pressure in the sterilizing apparatus decreases at the same speed as the pressure in the cans.

When the cooling has been completed, pipe 31 is opened by opening valve 32, whereupon, after the water has been removed from tank 5, the cans are taken out of drum 37 through door 18 and conveyed to the storage department of the canning plant.

No swelling or bulging of the cans occurs during the sterilizing process just described, because of the pressure in the sterilizing apparatus having increased and decreased automatically at substantially the same speed as the pressure in the cans. Therefore, all the cans have the same appearance they had when they were put in the sterilizing apparatus. All of the cans are free from buckles; therefore, the contents of none of the cans have to be worked over again. All of the cans are free from leaks; therefore, the contents of none of the cans will be spoiled by ferments that otherwise would be introduced into the cans through the leaks.

As will be understood, bulging, buckling or leaking of the cans does not occur during the sterilizing of the food products by the use of my invention. Therefore, the sterilizing of food products by the use of my invention can be also carried out in a thorough manner when the sterilizing temperature is very high, whereby during the storing of the canned food product the customary spoiling of the contents of the cans by ferments not destroyed by sterilizing is prevented.

It makes no difference in the processing whether exhausting is applied to the food product or not. With exhausting applied the sterilizing tank 5 is proportionately exhausted after it has introduced into it water in the aforesaid proportion and that has the same temperature as the contents of the exhausted containers at the sealing time of the containers, which temperature generally lies between 120° and 180° F. This has the effect that during the subsequent heating and cooling of the exhausted food product there will be substantially no difference between the pressure in the exhausted containers and the pressure in the sterilizing apparatus, and that when the cooling of the food product has been completed there will be a sub-atmospheric pressure or vacuum in the sterilizing apparatus as indicated on vacuum gauge 35, which is as high as the vacuum in the containers.

It is clear that with the use of my invention there can be neither any denting, that is to say, inward bulging of the cans, which occurs during the customary cooling of the sterilized food products, and there is neither any breaking of glass containers because of the avoidance of any sudden heating and cooling in the process described.

The process thus described for carrying out my invention is very simple. All that is necessary is to introduce into the loaded sterilizing apparatus such an amount of water (of the sealing temperature of the food product) that the proportion between the water-filled space and unfilled space in the sterilizing apparatus is substantially the same as the proportion between the filled and unfilled space in the food containers, and to hermetically seal the loaded sterilizing apparatus and then carry out the sterilizing of the food product by heating and cooling the water in the sterilizing apparatus by surface contact with the heating and cooling mediums.

There is no attention whatsoever required, during the sterilizing of a food product by the use of my invention, for neutralizing the pressure in the food containers, the neutralizing of the pressure in the containers taking care of itself, for the neutralizing is an inherent consequence of the said proportional amount of water (of the sealing temperature of the food product) in the loaded sterilizing apparatus, of the hermetical sealing of the loaded and water-containing sterilizing apparatus, with the water therein being under the pressure of the atmosphere when the sealing takes place, and of the heating and cooling of the water during the sterilizing by surface contact with the heating and cooling mediums. All that is required is to heat the water to the sterilizing temperature of the food product to keep it at the sterilizing temperature for the required length of time and to cool it to the desired temperature.

The neutralizing of the pressure in the food containers during the sterilizing process, being carried out without any mechanical devices, is self-neutralizing or auto-neutralizing of pressure in the true sense. The pressure in the food containers is a super-atmospheric pressure during the heating step of the sterilizing process, but is a sub-atmospheric pressure or vacuum during the cooling step of the sterilizing process when the cooling goes below the sealing temperature of the food product, as is always the case when exhausting has been applied to the food product.

The unfilled or expansion space in the food containers is the most important factor as to the amount of pressure in the containers during the sterilizing, the smaller the unfilled space the larger is the pressure in the containers, and the larger the unfilled space the smaller is the pressure in the containers.

Therefore, to assume a certain pressure in the containers during the sterilizing and then work with such pressure in the sterilizing apparatus is most hazardous to the containers, as it may bulge, buckle, cause leaks, burst or cave-in the cans when it is considered that during the sterilizing of food products the temperature in the containers may rise to about any pressure, low or high, in accordance with the particular filling up of the containers.

With the use of applicant's invention there is no assumption of any particular pressure being in the containers during the sterilizing operations, as the pressure in the containers become neutralized spontaneously, no matter what the pressure or the vacuum in the containers may be at any moment during the heating and cooling steps of the sterilizing process.

It is satisfactory to neutralize the pressure in the cans by an assumed pressure during the pasteurizing of carbonated beverages in cans, because the pasteurizing of carbonated beverages takes place always at virtually the same temperature, which is very low when compared with the sterilizing temperature of food products, and it takes place in narrow cans, which do not buckle and leak and cave in as readily as the much wider food cans.

Having now described my invention, I claim:

1. The process of sterilizing food products which comprises putting a food product with the customary liquid into containers, sealing the food product in the containers, loading the containers into a sterilizing apparatus, introducing into the apparatus an amount of water of the sealing temperature of the food product such that the proportion between the waterfilled space and the unfilled space in the sterilizing apparatus is substantially the same as the proportion between the filled and unfilled space in the containers, hermetically sealing the apparatus, agitating the contents of the containers, heating the water by surface contact to the sterilizing temperature, keeping the water at the sterilizing temperature for the required length of time and cooling the water by surface contact, whereby bulging, buckling, leaking and venting of the containers during the sterilizing operations are prevented.

2. The process of sterilizing food products, which comprises introducing into a sterilizing apparatus which is loaded with partially filled sealed containers of a food product, such an amount of water of the sealing temperature of the food product that the proportion between the water-filled space and the unfilled space in the sterilizing apparatus is like the proportion between the filled and unfilled space in the containers, hermetically sealing the sterilizing apparatus and sterilizing the food product by heating and cooling the water by surface contact, whereby bulging, buckling, leaking and venting of the containers during the sterilizing of the food product are prevented.

3. The process of sterilizing food products, which comprises loading a sterilizing apparatus with partially filled containers of a canned food product, introducing into the sterilizing apparatus such an amount of water of the sealing temperature of the food product that the water filled space in the sterilizing apparatus is proportionally as large as the filled space in the food containers, hermetically sealing the sterilizing apparatus and sterilizing the food product by heating and cooling the water by surface contact with the heating and cooling medium.

4. The process of sterilizing canned food products, which comprises introducting into a loaded sterilizing apparatus such an amount of water of the sealing temperature of the food product that the water-filled space in the sterilizing apparatus is proportionally as large as the filled space in the containers with which the sterilizing apparatus is loaded, hermetically sealing the sterilizing apparatus and sterilizing the food product by heating and cooling the water by surface contact with the heating and cooling medium, whereby physical injury to the containers during the sterilizing operations is prevented.

5. The process of sterilizing food products, which comprises adjusting the temperature of the water to be introduced into a sterilizing apparatus to the sealing temperature of the canned food product with which the sterilizing apparatus is to be loaded, loading the sterilizing apparatus with partially filled containers of the canned food product, introducing into the sterilizing apparatus such an amount of such water that the water-filled space in the sterilizing apparatus is proportionally as large as the filled space in the containers, hermetically sealing the sterilizing apparatus and sterilizing the food product by raising and lowering the temperature of the water by surface contact with the heating and cooling medium.

6. The process of sterilizing food products which consists in placing in a vessel partially filled containers containing the food product to be sterilized, introducing into the vessel an amount of water such that the proportion between the water-filled space and the unfilled space in the vessel is approximately the same as that between the filled and unfilled spaces in the containers, hermetically sealing the vessel, heating the water in the vessel to the desired sterilizing temperature for the desired length of time, and then cooling the water in the vessel, whereby to prevent physical injury to the containers.

7. The process of sterilizing food products, which comprises exhausting and sealing food containers under any suitable pressure, loading the sterilizing apparatus with the food containers, introducing into the sterilizing apparatus such an amount of water of the sealing temperature of the food containers that the proportion between the filled and unfilled space in the sterilizing apparatus is like the proportion between the filled and unfilled space in the food containers, closing the sterilizing apparatus, equalizing the pressure in the sterilizing apparatus to the pressure in the food containers, hermetically sealing the sterilizing apparatus at such pressure, sterilizing the food containers by surface heating and cooling the sterilized food containers by surface cooling.

8. The process of sterilizing food products, which comprises loading into a sterilizing apparatus exhausted food containers sealed at a subatmospheric pressure, filling into the sterilizing apparatus such an amount of water of the sealing temperature of the food containers that the proportion between the filled and unfilled space in the sterilizing apparatus is like the proportion between the filled and unfilled space in the food containers, adjusting the pressure in the sterilizing apparatus to the pressure in the food containers, hermetically sealing the sterilizing apparatus at such pressure, sterilizing the food containers by surface heating and cooling the sterilized food containers by surface cooling.

9. The process of sterilizing food products, which comprises filling so much water of the sealing temperature of the food containers into a sterilizing apparatus loaded with the food containers that the proportion between the filled and unfilled space in the sterilizing apparatus is like the proportion between the filled and unfilled space in the food containers, adjusting the filled space in the food containers, adjusting the pressure in the sterilizing apparatus to the pressure in the food containers and processing the food containers by surface heating and by surface cooling to prevent that the aforesaid proportion be destroyed during the heating and cooling of the food containers.

HERMAN HEUSER.